(12) United States Patent
O'Neill

(10) Patent No.: US 6,868,122 B2
(45) Date of Patent: Mar. 15, 2005

(54) DISTRIBUTED INTRAFRAME TRANSMISSION IN DIGITAL VIDEO COMPRESSION

(75) Inventor: Thomas O'Neill, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 141 days.

(21) Appl. No.: 09/778,569

(22) Filed: Feb. 7, 2001

(65) Prior Publication Data

US 2002/0106023 A1 Aug. 8, 2002

(51) Int. Cl.$^7$ ................................................ H04N 7/18
(52) U.S. Cl. ........................... 375/240.12; 375/240.13; 375/240.26
(58) Field of Search ....................... 375/240.11–240.29

(56) References Cited

U.S. PATENT DOCUMENTS

| | | | | |
|---|---|---|---|---|
| 5,260,783 A | * | 11/1993 | Dixit ..................... | 375/240.13 |
| 5,471,248 A | * | 11/1995 | Bhargava et al. ...... | 375/240.24 |
| 5,508,743 A | * | 4/1996 | Iizuka ..................... | 348/415.1 |
| 5,666,162 A | * | 9/1997 | Iizuka ..................... | 348/415.1 |
| 6,304,295 B1 | * | 10/2001 | Krishnamurthy et al. | 348/420.1 |

* cited by examiner

Primary Examiner—Andy Rao
(74) Attorney, Agent, or Firm—Martine & Penilla, LLP

(57) ABSTRACT

The present invention provides a method and apparatus for distributed intraframe transmission. In one embodiment of the present invention, digital images are divided into regions. In this embodiment, an I-frame is not transmitted all at once. Instead, in each transmission, a region of the image is compressed without using interframe compression while the rest of the image is compressed using interframe compression. The region transmitted without interframe compression changes with each transmission. Thus, over the course of several transmissions every region of the image is transmitted without interframe compression. A transmission schedule controls the transmission of I-frame data for an entire image over the course of several frame transmissions. In one embodiment, a digital image is divided into M regions, and one region is transmitted without using interframe compression in each frame. In one embodiment, the M regions are numbered from 0 to M−1, and a region is selected for transmission without using interframe compression when the region number is equal to MOD (F, M), where F is the frame number. In one embodiment, the regions are non-overlapping rectangular regions. In another embodiment, the regions are strips of pixels. In another embodiment, regions are non-contiguous pixels. In yet another embodiment, regions which will be transmitted without interframe compression comprise sets of pixels which have not been refreshed within M frames and pixels which are selected by a compressibility criteria.

17 Claims, 7 Drawing Sheets

500
Digital Image

| 501 Region 1 Pixel Group 0 | 502 Region 2 Pixel Group 1 | 503 Region 3 Pixel Group 2 | 504 Region 4 Pixel Group 3 | 505 Region 1 Pixel Group 4 | 506 Region 2 Pixel Group 5 |
|---|---|---|---|---|---|
| 507 Region 3 Pixel Group 6 | 508 Region 4 Pixel Group 7 | 509 Region 1 Pixel Group 8 | 510 Region 2 Pixel Group 9 | 511 Region 3 Pixel Group 10 | 512 Region 4 Pixel Group 11 |
| 513 Region 1 Pixel Group 12 | 514 Region 2 Pixel Group 13 | 515 Region 3 Pixel Group 14 | 516 Region 4 Pixel Group 15 | 517 Region 1 Pixel Group 16 | 518 Region 2 Pixel Group 17 |
| 519 Region 3 Pixel Group 18 | 520 Region 4 Pixel Group 19 | 521 Region 1 Pixel Group 20 | 522 Region 2 Pixel Group 21 | 523 Region 3 Pixel Group 22 | 524 Region 4 Pixel Group 23 |

Figure 5

DISTRIBUTED INTRAFRAME TRANSMISSION IN DIGITAL VIDEO COMPRESSION

BACKGROUND OF THE INVENTION

1. Field of the Invention

The present invention relates to the field of video compression, and in particular to a method and apparatus for distributed intraframe transmission.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Digital video sequences contain large amounts of data. Digital video sequences are typically compressed to increase transmission speed and reduce storage space requirements. One compression technique, known as interframe compression, encodes differences between transmitted frames. Since the difference between temporally close frames is small, less data is required to transmit the differences between two similar frames than to transmit an entire frame. However, as frames become more temporally distant from a reference frame, the differences typically increase. Thus, interframe compression becomes less effective. To reduce the difference between a reference frame and a transmitted frame, a new, complete reference frame, termed an "I-frame," is transmitted periodically.

Some applications transmit the difference between the transmitted frame and the previous frame. However, errors sometimes accumulate using this technique. In some of these applications, an I-frame is periodically transmitted to compensate for these errors.

I-frames are images encoded without interframe compression (i.e., without reference to any other frame). Thus, it typically requires significantly more data to represent an I-frame than to represent a non-I-frame. In some applications, transmission of I-frames sometimes results in noticeable delays in the digital video transmission. This problem can be better understood by reviewing digital video compression.

Digital Video Compression

Typically, digital video compression algorithms take advantage of both spatial and temporal coherence of video streams by using intraframe and interframe compression, respectively. Intraframe compression occurs when a frame of a video stream is compressed in a manner which does not rely on values in any other frame of the video stream. Reducing the precision of pixel color representation is one example of intraframe compression. Interframe compression occurs when a frame of a video stream is compressed in a manner which relies on values in at least one other frame of the video stream. Encoding a frame with a set of differences from a previous reference frame is an example of interframe compression.

In algorithms such as MPEG-2, interframe compression is achieved by encoding the difference between that frame and a previous frame, termed an "intra-frame" or "I-frame." This compression method typically results in better compression than encoding each frame without reference to other frames. Frequently, frames which are transmitted in close temporal proximity to one another have fewer differences than frames which are not in close temporal proximity to one another. Thus, as an I-frame becomes less recent, the compression rate typically falls because the frames being encoded are less similar to the I-frame than previous frames. Additionally, transmission errors sometimes result in errors in the I-frame and subsequent frames.

To compensate for the above problems, new I-frames are transmitted periodically. The I-frames are typically encoded using intraframe compression. However, no interframe compression is used when transmitting I-frames. Thus, representation of I-frames requires significantly more data. This increased size slows transmission rates. In some real-time encoding and/or decoding applications, the large size of I-frames can result in noticeable delays or in some frames being dropped. A dropped frame is a frame which is either not transmitted or not displayed.

SUMMARY OF THE INVENTION

The present invention provides a method and apparatus for distributed intraframe transmission. In one embodiment of the present invention, digital images are divided into regions. In this embodiment, an I-frame is not transmitted all at once. Instead, for each frame, a region of the image is compressed without using interframe compression while the rest of the image is compressed using interframe compression. The region transmitted without interframe compression changes with each frame. Thus, over the course of several frames every region of the image is transmitted without interframe compression. A transmission schedule controls the transmission of I-frame data for an entire image over the course of several frame transmissions.

In one embodiment, a digital image is divided into M regions, and in each frame one region is transmitted without using interframe compression. In one embodiment, the M regions are numbered from 0 to M−1, and a region is selected for transmission without using interframe compression when the region number is equal to MOD (F, M), where F is the frame number. Thus, each portion of a digital image is guaranteed to be refreshed every M frames. The combined size of the one region transmitted without interframe compression and the M−1 regions transmitted using interframe compression is typically smaller than the size of a complete I-frame. This distributes the computation and transmission burdens more evenly over all of the frames and helps to prevent uneven delays or dropped frames.

In one embodiment, the regions are non-overlapping rectangular regions. In another embodiment, the regions are strips of pixels. In another embodiment, regions are non-contiguous pixels. In yet another embodiment, regions which will be transmitted without interframe compression comprise sets of pixels which have not been refreshed within M frames and pixels which are selected by a compressibility criteria. In one embodiment, the compressibility criteria is that a pixel is included in the region whenever it is more efficient to not use interframe compression on that pixel. In one embodiment, the transmission of the pixels which have not been refreshed within M frames is scheduled over multiple frame transmissions. In another embodiment, pixels which are determined to be sufficiently unchanged from the last time they were included in a region transmitted without using interframe compression are transmitted using interframe compression.

In one embodiment, interframe compression is accomplished by making reference to the previous frame rather than an I-frame. In this embodiment, a digital image is divided into M regions, and a transmission schedule determines when to transmit a region without using interframe compression. The region transmitted without interframe transmission changes with each transmission, so the transmission of I-frame data is accomplished over the course of several frame transmissions. Since each transmitted frame is typically similar to the immediately preceding frame, interframe compression is typically efficient. Thus, the number of frames between regional refreshes allowable without unacceptable loss of picture quality is typically higher than in the above methods. As a result, the size of the interframe-only regions is reduced without unacceptable loss of quality, which reduces the amount of I-frame data transmitted with each frame.

In another embodiment, a video image is divided into M regions and each region is encoded as an independent movie. In this embodiment, a scheduler is used to insure the independent movies transmit their I-frames at different times. In one embodiment, the independent movies are encoded using the MPEG video codec.

BRIEF DESCRIPTION OF THE DRAWINGS

These and other features, aspects and advantages of the present invention will become better understood with regard to the following description, appended claims and accompanying drawings where:

FIG. 5 is a block diagram of digital image division in accordance with one embodiment of the present invention.

DETAILED DESCRIPTION OF THE INVENTION

The invention is a method and apparatus for distributed intraframe transmission. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

In one embodiment of the present invention, digital images are divided into regions. In this embodiment, an I-frame is not transmitted all at once. Instead, in each frame, a region of the image is compressed without using interframe compression while the rest of the image is compressed using interframe compression. The region transmitted without interframe compression changes with each frame transmission. Thus, over the course of several frame transmissions every region of the image is transmitted once without interframe compression. A transmission schedule controls the transmission of I-frame data for an entire image over the course of several frame transmissions.

Figure 1:
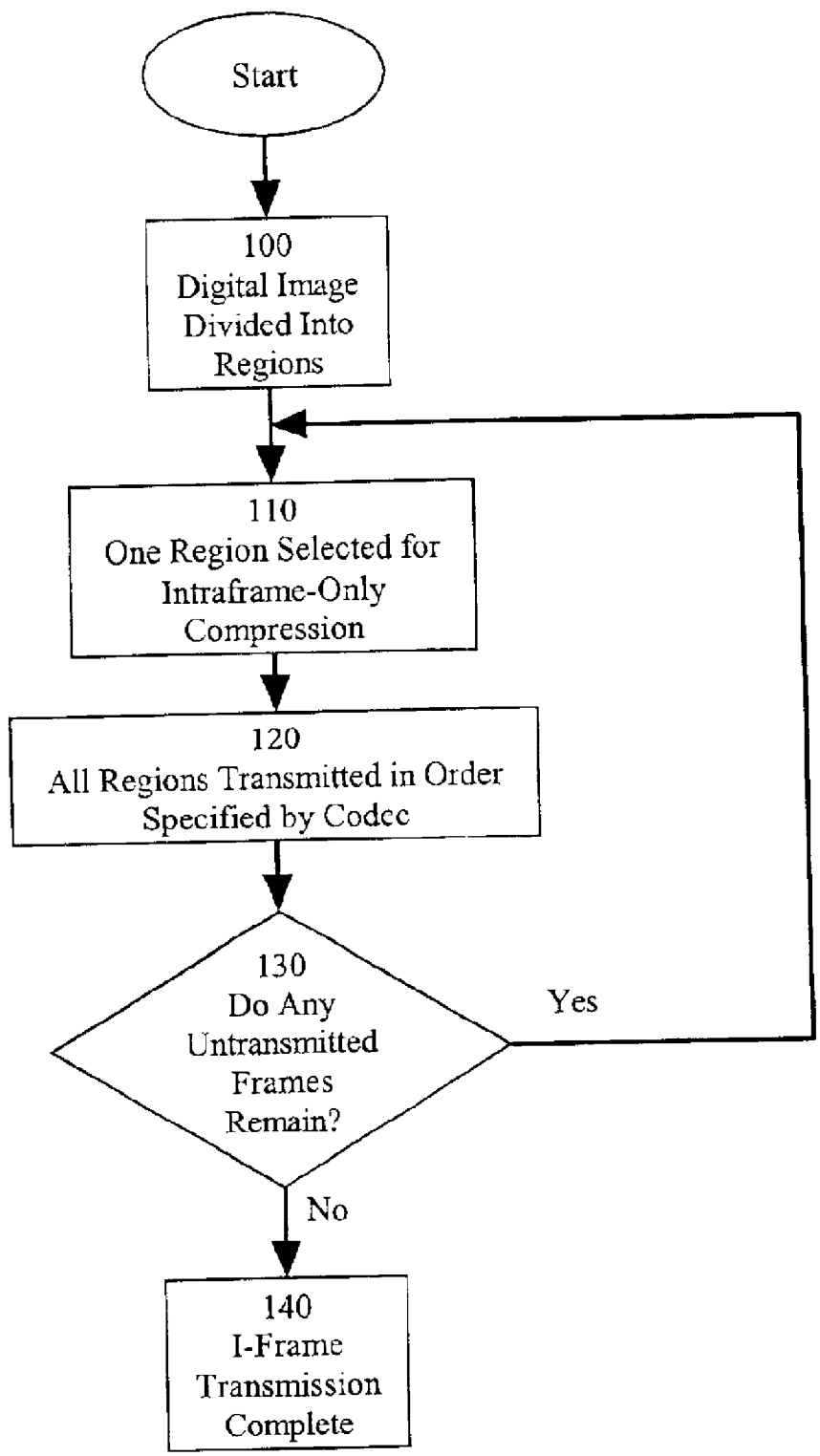
FIG. 1 is a flow diagram of the process of distributed I-frame transmission in accordance with one embodiment of the present invention.

FIG. 1 illustrates the process of distributed I-frame transmission in accordance with one embodiment of the present invention. At step 100, a digital image is divided into regions. At step 110, one region is selected for intraframe-only (i.e., no interframe) compression. At step 120, all regions are transmitted in an order specified by a codec. The selected region is transmitted without using interframe compression. At step 130, it is determined whether any frames remain to be transmitted. If an untransmitted frame remains, the process repeats at step 110. If no untransmitted frames remain, at step 140, the I-frame data transmission is complete.

In one embodiment, a digital image is divided into M regions, and a region is transmitted without interframe compression with each frame. In one embodiment, the M regions are numbered from 0 to M−1, and a region is selected for transmission without interframe compression when the region number is equal to MOD (F, M), where F is the frame number. Thus, each region of an I-frame is guaranteed to be refreshed every M frames.

Figure 2:
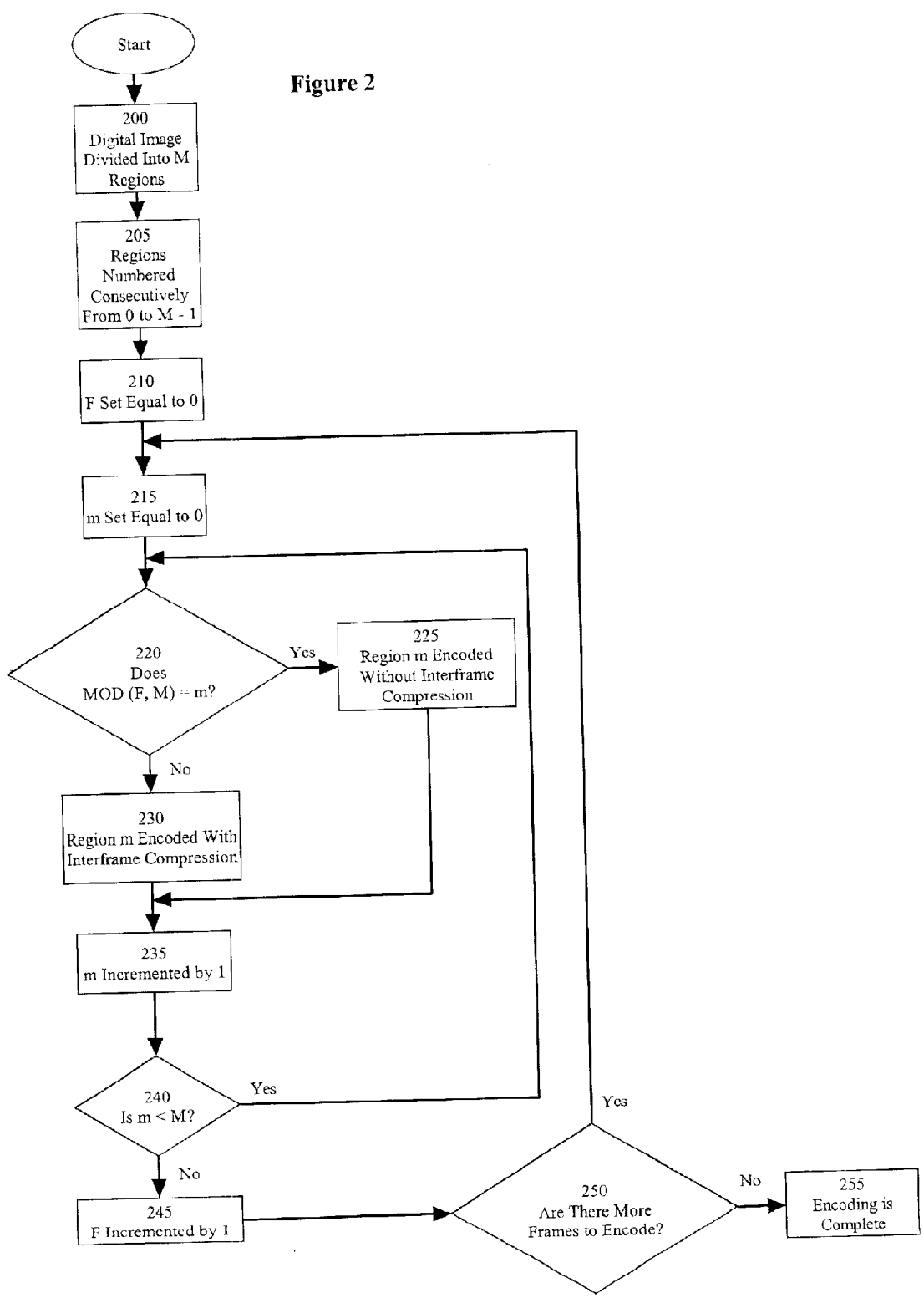
FIG. 2 is a flow diagram of the process of encoding digital video data in accordance with one embodiment of the present invention.

FIG. 2 illustrates the process of encoding digital video data in accordance with one embodiment of the present invention. At step 200, a digital image is divided into M regions. At step 205, the regions are numbered consecutively from 0 to M−1 based on the order they are transmitted in the codec. At step 210, F is set to equal to 0. At step 215, a region counter, m, is set equal to 0. At step 220, it is determined whether MOD (F, M)=m. If MOD (F, M)=m, at step 225, region m is encoded without using interframe compression and the process continues at step 235. If MOD (F, M) is not equal to m, at step 230, region m is encoded using interframe compression and the process continues at step 235.

At step 235, m is incremented by 1. At step 240, it is determined whether m is less than M. If m is less than M, the process repeats at step 220. If m is not less than M, at step 245, the frame is complete and F is incremented by 1. At step 250, it is determined whether there are more frames to encode. If there are more frames to encode, the process repeats at step 215. If there are no more frames to encode, at step 255, encoding is complete.

Figure 3:
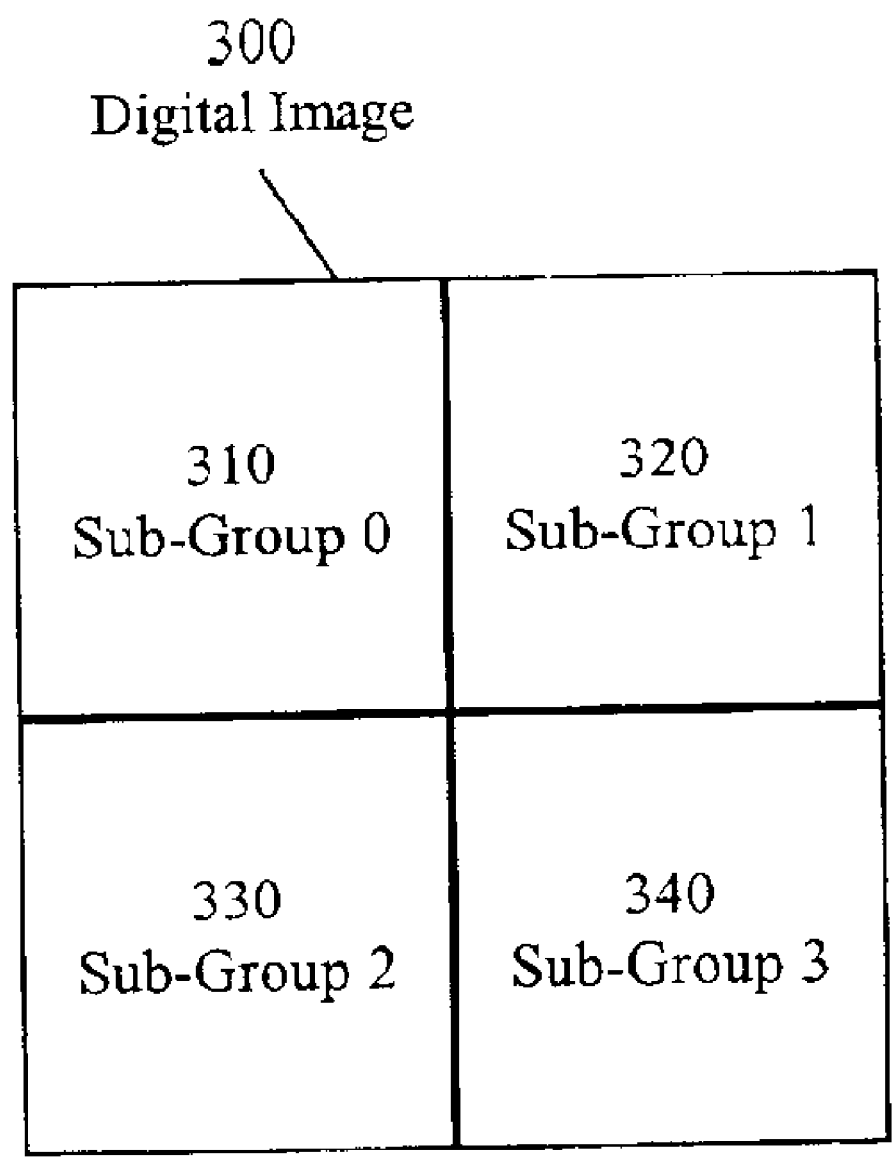
FIG. 3 is a block diagram of digital image division in accordance with one embodiment of the present invention.

In one embodiment, the sub-groups are non-overlapping rectangular regions. FIG. 3 illustrates an example of digital image division in accordance with one embodiment of the present invention. The digital image (300) is divided into sub-groups 0 (310), 1 (320), 2 (330) and 3 (340). In one embodiment, each sub-group is an n by n square of pixels.

Figure 4:
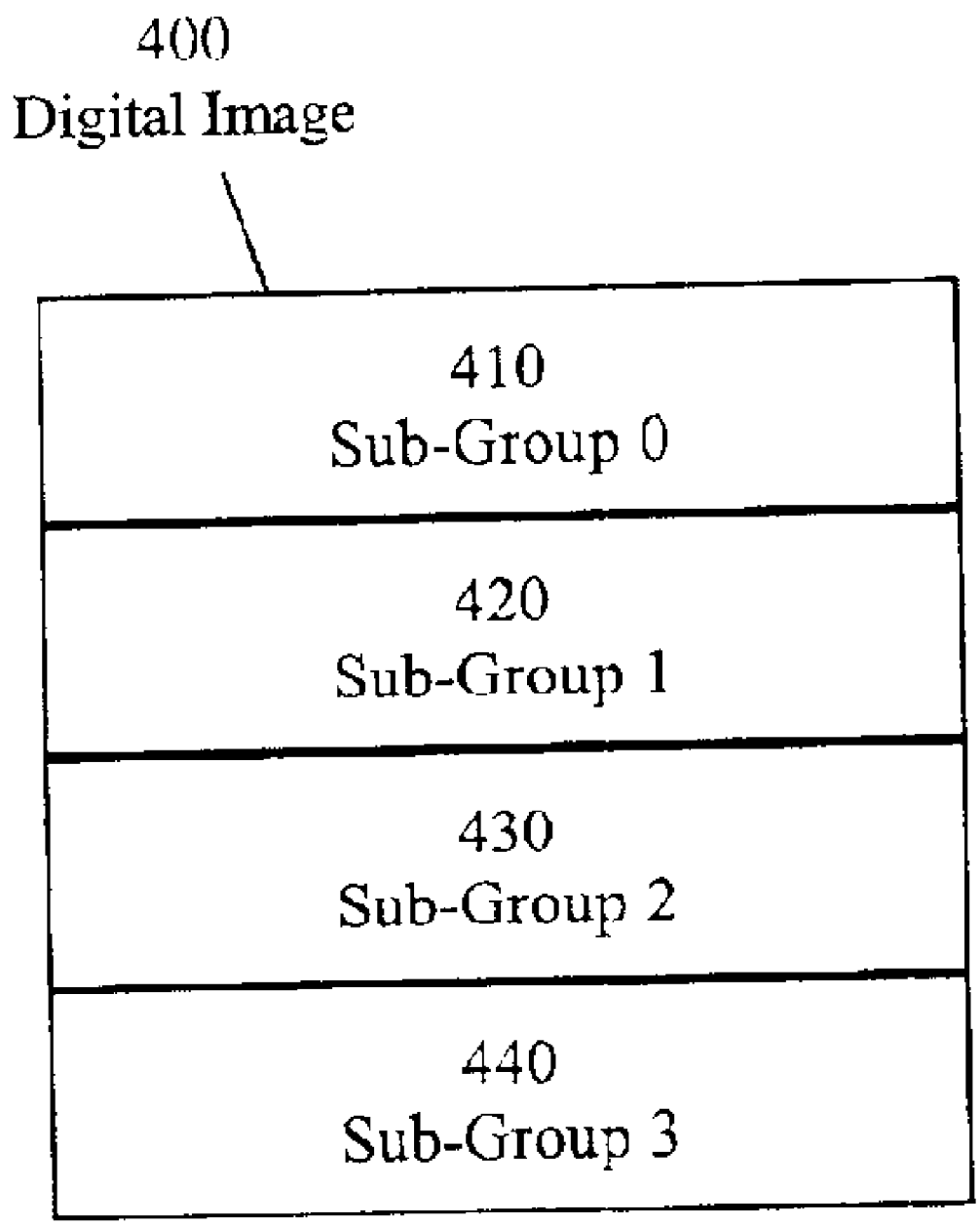
FIG. 4 is a block diagram of digital image division in accordance with one embodiment of the present invention.

In another embodiment, the regions are strips of pixels running the width of the image. FIG. 4 illustrates an example of digital image division in accordance with one embodiment of the present invention. The digital image (400) is divided into regions 0 (410), 1 (420), 2 (430) and 3 (440). Each region is a strip of pixels.

In another embodiment, regions are non-contiguous regions of pixels. FIG. 5 illustrates an example of digital image division in accordance with one embodiment of the present invention. The digital image (500) is divided into pixel groups 0 (501), 1 (502), 2 (503), 3 (504), 4 (505), 5 (506), 6 (507), 7 (508), 8 (509), 9 (510), 10 (511), 11 (512), 12 (513), 13 (514), 14 (515), 15 (516), 16 (517), 17 (518), 18 (519), 19 (520), 20 (521), 21 (522), 22 (523) and 23 (524). In this embodiment, pixels are divided into G N pixel by N pixel areas of the image. In FIG. 5, G is equal to 24.

These pixel groups labeled from 0 to G−1 based on the order they are transmitted in the codec and are formed into regions. Pixel groups are assigned to regions wherein MOD (g, M) is equal to the same number for all the pixel groups in a region wherein g is a pixel group's number. In FIG. 5, M is equal to 4. Thus, pixel groups 0, 4, 8, 12, 16, and 20 comprise region 1. Likewise, pixel groups 1, 5, 9, 13, 17, and 21 comprise region 2. Additionally, pixel groups 2, 6, 10, 14, 18, and 22 comprise region 3, and pixel groups 3, 7, 11, 15, 19, and 23 comprise region 4. In one embodiment, a pixel group is selected for transmission without interframe compression whenever MOD (F−g, M)=0, wherein F is the frame number. Thus, if F=3, the pixel groups of region 4 are encoded without using interframe compression.

Figure 6:
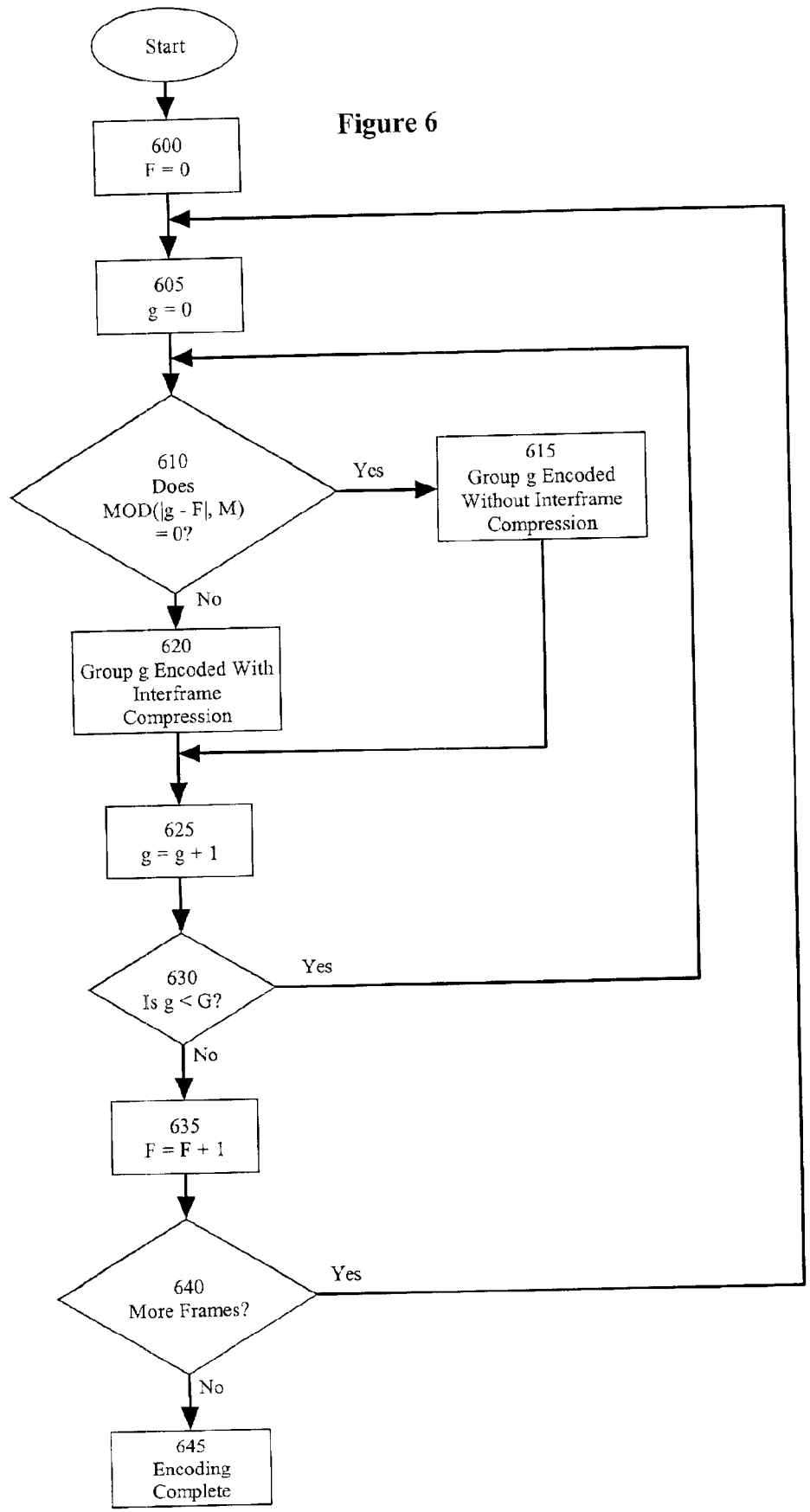
FIG. 6 is a flow diagram of the process of encoding digital video data in accordance with one embodiment of the present invention.

FIG. 6 illustrates the process of encoding digital video data in accordance with one embodiment of the present invention. At step 600, F is set equal to 0. At step 605, g is set equal to 0. At step 610, it is determined whether MOD(|g−F|, M) is equal to 0. If MOD(|g−F|, M) is equal to 0, at step 615, group g is encoded without interframe compression and the process continues at step 625. If MOD(|g−F|, M) is not equal to 0, at step 620, group g is encoded with interframe compression and the process continues at step 625.

At step 625, g is incremented by 1. At step 630, it is determined whether g is less than G. If g is less than G, the process repeats at step 610. If g is not less than G, at step 635, F is incremented by 1. At step 640, it is determined whether there are more frames to transmit. If there are more frames to transmit, the process repeats at step 605. If there are no more frames to transmit, at step 645, the encoding is complete.

Figure 7:
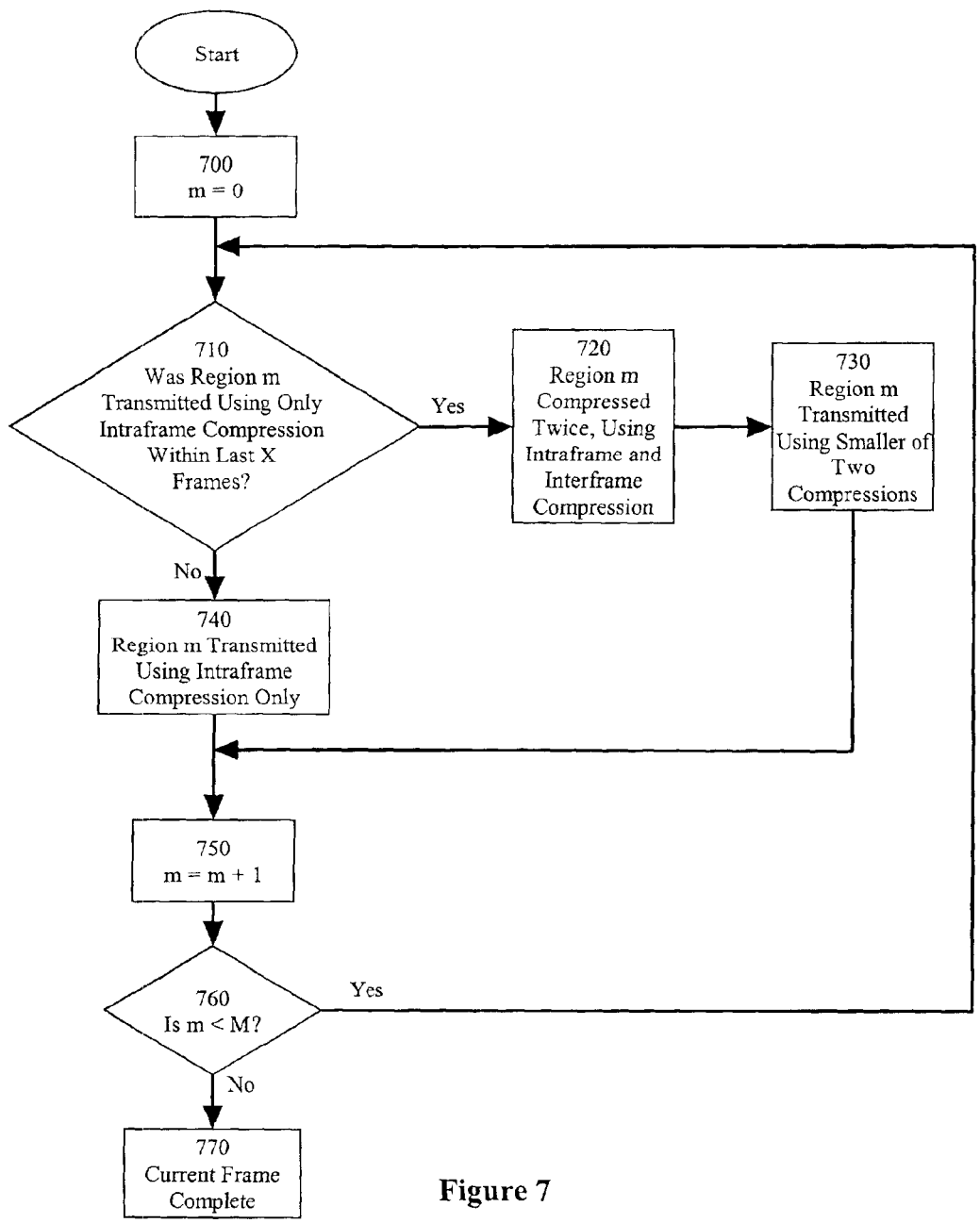
FIG. 7 is a flow diagram of the process of determining regions to be transmitted without using interframe compression in accordance with one embodiment of the present invention.

In yet another embodiment, sub-groups comprise sets of pixels which are selected by a compressibility criteria and pixels which have not been refreshed within X frames. FIG. 7 illustrates the process of determining regions to be transmitted without using interframe compression in accordance with one embodiment of the present invention. At step 700 m is set equal to 0. At step 710, it is determined whether region m transmitted using only intraframe compression within the last X frames. If region m transmitted using only intraframe compression within the last frames, at step 720, region m is compressed twice, using intraframe and interframe compression. At step 730, region m is transmitted using the smaller of the two compressions and the process continues at step 740.

If at step 710 it is determined that region m was not transmitted using only intraframe compression within the last X frames, at step 730, region m is transmitted using intraframe compression only and the process continues at step 740. At step 740, m is incremented by 1. At step 750, it is determined whether m is less than M. If m is less than M, the process continues at step 720. It m is not less than M, at step 760, the current frame is complete.

In this embodiment, it is not required to transmit the region transmitted without interframe compression all at the same time. A transmission scheduler may send the pixel information for the image in the order specified by the codec. The region only defines which pixel information is sent without using interframe compression.

In one embodiment, the transmission of the pixels which have not been refreshed within X frames is scheduled over multiple frame transmissions. In another embodiment, pixels which are determined to be sufficiently unchanged from the last time they were included in a region transmitted without using interframe compression are transmitted using interframe compression. For example, if the pixels of a region have the same values as the last time the region was compressed without using interframe compression, the embodiment determines that the region has not changed significantly. Thus, the region is encoded using interframe compression to attain a higher compression rate.

In another embodiment, a video image is divided into M regions and each region is encoded as an independent movie. In this embodiment, a scheduler is used to insure the independent movies transmit their I-frames at different times. In one embodiment, the independent movies are encoded using one of the MPEG video codecs.

In one embodiment, interframe compression is accomplished by making reference to the previous frame rather than an I-frame. Since each transmitted frame is typically similar to the immediately preceding frame, interframe compression is typically efficient. In this embodiment, intraframe-only compression is no longer needed to keep the reference image current. However, intraframe-only compression is useful for correcting errors that may accumulate. In this embodiment, a digital image is divided into M regions, and a transmission schedule determines when to transmit a region without using interframe compression. The region transmitted without interframe compression changes with each transmission, so the transmission of I-frame data is accomplished over the course of several frame transmissions. Because the only purpose of the intraframe-only updates is error correction, typically M can be larger than in codecs where intraframe-only compression is used to keep the reference image current. Thus, less intraframe-only data is transmitted with each frame.

Thus, a method and apparatus for distributed intraframe transmission is described in conjunction with one or more specific embodiments. The invention is defined by the following claims and their full scope and equivalents.

What is claimed is:

1. A method for encoding digital data comprising:
   accessing a plurality of frames, each frame of the plurality of frames including a digital video image;
   dividing each frame of said plurality of frames into a plurality of regions, each region of the plurality of regions being assigned a unique consecutive number;
   encoding all except one region of said plurality of regions in each frame of the plurality of frames into encoded regions using interframe compression;
   compressing the one region of said plurality of regions in each frame of the plurality of frames without using interframe compression into a compressed region, the one region of the plurality of regions being selected in each frame based on an order of the unique consecutive number, the one region of said plurality of regions being a different region in each frame of the plurality of frames, each region of the plurality of regions being compressed once in the plurality of frames without using interframe compression; and
   transmitting said encoded regions and said compressed region for each frame of the plurality of frames.

2. The method as recited in claim 1 further comprising:
   numbering said plurality of regions based on a compression sequence.

3. The method as recited in claim 1 further comprising:
   dividing said digital video image into non-overlapping rectangular groups of pixels.

4. The method as recited in claim 1 further comprising:
   dividing said digital video image into strips of pixels.

5. The method as recited in claim 1 further comprising:
dividing said digital video image into a plurality of non-contiguous pixel groups.

6. The method as recited in claim 1, wherein compressing the one region of said plurality of regions includes compressing the one region using intraframe compression.

7. A computer readable medium comprising instructions that when executed implement a method for compressing digital video comprising:
program instructions for accessing a plurality of frames, each frame of the plurality of frames including a digital video image;
program instructions for dividing each frame of said plurality of frames into a plurality of regions, each region of the plurality of regions being assigned a unique consecutive number;
program instructions for encoding all except one region of said plurality of regions in each frame of the plurality of frames into encoded regions using interframe compression; and
program instructions for compressing the one region of said plurality of regions in each frame of the plurality of frames without using interframe compression, the one region of the plurality of regions being selected in each frame based on an order of the unique consecutive number, the one region of said plurality of regions being a different region in each frame of the plurality of frames; each region of the plurality of regions being compressed once in the plurality of frames without using interframe compression; and
program instructions for transmitting said encoded regions and said compressed region for each frame of the plurality of frames.

8. The computer readable medium as recited in claim 7 further comprising:
program instructions for numbering said plurality of regions based on a compression sequence.

9. The computer readable medium as recited in claim 7 further comprising:
program instructions for dividing said digital video image into non-overlapping rectangular groups of pixels.

10. The computer readable medium as recited in claim 7 further comprising:
program instructions for dividing said digital video image into strips of pixels.

11. The computer readable medium as recited in claim 7 further comprising:
program instructions for dividing said digital video image into a plurality of non-contiguous pixel groups.

12. The computer readable medium as recited in claim 7, wherein compressing the one region of said plurality of regions includes compressing the one region using intraframe compression.

13. A method for encoding digital data comprising:
accessing a plurality of frames, each frame of the plurality of frames including a digital video image;
dividing each frame of said plurality of frames into a plurality of regions, each one of the plurality of regions being assigned a unique consecutive number;
numbering the plurality of regions wherein each of the plurality of regions is assigned a unique consecutive number;
selecting one region of the plurality of regions based on the unique consecutive number wherein each of the plurality of regions is selected in the order of the consecutive number;
encoding the one region of the plurality of regions in each frame of the plurality of frames, the one region being encoded by intraframe compression and interframe compression when the one region has been encoded by intraframe compression within a set number of past frames, and the one region being encoded by intraframe compression when the one region has not been encoded by intraframe compression within the set number of past frames; and
transmitting the one region using a smaller one of the interframe compression and the intraframe compression when the one region has been encoded by intraframe compression within the set number of past frames and transmitting the one region using intraframe compression when the one region has not been encoded by intraframe compression within the set number of past frames.

14. The method as recited in claim 13 further comprising:
numbering said plurality of regions based on a compression sequence.

15. The method as recited in claim 13 further comprising:
dividing said digital video image into non-overlapping rectangular groups of pixels.

16. The method as recited in claim 13 further comprising
dividing said digital video image into strips of pixels.

17. The method as recited in claim 13 further comprising:
dividing said digital video image into a plurality of non-contiguous pixel groups.

* * * * *